United States Patent
Kim et al.

(10) Patent No.: US 11,358,566 B2
(45) Date of Patent: Jun. 14, 2022

(54) IN-VEHICLE COMPLEX BIOMETRIC AUTHENTICATION SYSTEM AND OPERATION METHOD THEREOF

(71) Applicant: LG ELECTRONICS INC., Seoul (KR)

(72) Inventors: Kokeun Kim, Seoul (KR); Jihye Kim, Seoul (KR); Sooyoung Sim, Seoul (KR); Beomoh Kim, Seoul (KR); Sungjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 397 days.

(21) Appl. No.: 16/488,183

(22) PCT Filed: Mar. 18, 2019

(86) PCT No.: PCT/KR2019/003124
§ 371 (c)(1),
(2) Date: Aug. 22, 2019

(87) PCT Pub. No.: WO2020/189810
PCT Pub. Date: Sep. 24, 2020

(65) Prior Publication Data
US 2021/0331647 A1     Oct. 28, 2021

(51) Int. Cl.
*B60R 25/25*     (2013.01)
*B60R 25/34*     (2013.01)
(Continued)

(52) U.S. Cl.
CPC ............. *B60R 25/25* (2013.01); *B60R 25/34* (2013.01); *B60W 40/08* (2013.01); *G06V 40/50* (2022.01);
(Continued)

(58) Field of Classification Search
CPC ........ B60R 25/25; B60R 25/34; B60W 40/08; B60W 2556/10; B60W 2040/0809; G06K 9/00892; G06K 9/00926
See application file for complete search history.

(56) References Cited

U.S. PATENT DOCUMENTS 8,344,849 B2 *  1/2013  Larsson ................. B60R 25/25
                                                 340/5.2
9,418,491 B2 *  8/2016  Phillips .................. G07C 5/008
(Continued)

FOREIGN PATENT DOCUMENTS

JP      2017001615          1/2017
JP      2017001615  A  *   1/2017
(Continued)

OTHER PUBLICATIONS

PCT International Application No. PCT/KR2019/003124, Notification of Transmittal of the International Search Report and the Written Opinion of the International Searching Authority, or Declaration dated Dec. 17, 2019, 11 pages.

*Primary Examiner* — Nay Tun
(74) *Attorney, Agent, or Firm* — Lee Hong Degerman Kang Waimey

(57) ABSTRACT

An in-vehicle complex biometric authentication system includes: a sensor to sense a driver's boarding of a vehicle; a controller to perform driver authentication based on biometric information sensed by multiple biometric sensors when driver's boarding in a vehicle is detected by the sensor, and to collect driver's identification information and driving habit information during operation of a vehicle when the driver authentication is succeeded; and a memory to store the identification information and driving habit information as implicit authentication information, wherein the controller further detects situation recognition information related to the implicit authentication information, after the driver (Continued)

authentication is succeeded, and determines whether to perform additional authentications based on the matching result of the detected situation recognition information with the implicit authentication information. According the present invention, the system can provide a biometric authentication system to which the IOT is applied.

16 Claims, 6 Drawing Sheets

(51) Int. Cl.
  *B60W 40/08* (2012.01)
  *G06V 40/50* (2022.01)
  *G06V 40/70* (2022.01)
(52) U.S. Cl.
  CPC ..... *G06V 40/70* (2022.01); *B60W 2040/0809* (2013.01); *B60W 2556/10* (2020.02)

(56) References Cited

U.S. PATENT DOCUMENTS

| | | | | |
|---|---|---|---|---|
| 9,493,149 | B2 * | 11/2016 | Phelan | B60W 10/04 |
| 10,623,401 | B1 * | 4/2020 | Yager | H04W 12/68 |
| 2006/0273879 | A1 * | 12/2006 | Pudelko | B60R 25/20 |
| | | | | 340/5.72 |
| 2008/0172154 | A1 * | 7/2008 | Tanaka | B60R 16/0231 |
| | | | | 701/36 |
| 2015/0066238 | A1 | 3/2015 | Todd et al. | |
| 2015/0191178 | A1 * | 7/2015 | Roy | G06F 21/556 |
| | | | | 701/36 |
| 2018/0373855 | A1 * | 12/2018 | Chowdhury | B60W 40/09 |
| 2020/0152067 | A1 * | 5/2020 | Salles | G08G 1/20 |

FOREIGN PATENT DOCUMENTS

| | | | | |
|---|---|---|---|---|
| JP | 2017052380 | | 3/2017 | |
| KR | 101405233 | | 6/2014 | |
| KR | 101405233 B1 * | | 6/2014 | |
| KR | 20180018953 A * | | 2/2018 | |
| KR | 1020180018953 | | 2/2018 | |
| KR | 101929820 | | 12/2018 | |
| KR | 101929820 B1 * | | 12/2018 | ......... G06F 3/04847 |

* cited by examiner

IN-VEHICLE COMPLEX BIOMETRIC AUTHENTICATION SYSTEM AND OPERATION METHOD THEREOF

CROSS-REFERENCE TO RELATED APPLICATIONS

This application is the National Stage filing under 35 U.S.C. 371 of International Application No. PCT/KR2019/003124, filed on Mar. 18, 2019, the contents of which are hereby incorporated by reference herein in its entirety.

TECHNICAL FIELD

The present disclosure relates to an in-vehicle complex biometric authentication system and an operation method thereof, and more particularly, to an in-vehicle complex biometric authentication system and an operation method thereof, capable of preventing vehicle theft using a complex biometric authentication.

BACKGROUND ART

For the convenience of users of vehicles, various types of sensors and electronic devices are being installed. In particular, research on the Advanced Driver Assistance System (ADAS) of vehicles is being carried out actively for the convenience of users' driving. Furthermore, the development of autonomous vehicles is actively ongoing.

In addition, considering both the convenience and safety of users using vehicles, researches and applications on the driver authentication of the biometric authentication are actively ongoing.

The biometric authentication is a way to authenticate users based on behavioral results using a unique form of physical structure or body structure that corresponds to the user. The biometric authentication method is highly secure because it does not have to share prior secret information and uses user's physical information. However, the biometric authentication uses the user's unique biometric information, which can lead to information disclosure problems.

On the other hand, when the driver of the vehicle has performed biometric authentication and temporarily got off the vehicle for parking, refueling, etc., a vehicle theft problem may occur.

In such cases, if authentication is set to be maintained continuously for the convenience of the driver, the prevention of vehicle theft may be lax. On the other hand, if biometric authentication is required repeatedly by emphasizing the aspects of prevention of vehicle theft, the discomfort of the driver may be greatly increased, thereby reducing the efficiency of use.

DISCLOSURE

Technical Problem

Therefore, an object of the present disclosure is to provide an in-vehicle biometric authentication system and an operation method thereof that enable the driver to perform erratic driver authentication using multiple biometric sensors in the vehicle and to perform implicit authentication whenever a suspected theft of the vehicle is detected during the vehicle operation.

In addition, another object of the resent disclosure is to provide an in-vehicle biometric authentication system and an operation method thereof, which enable the payment process to be performed automatically without additional authentication using implicit authentication, in situations requiring payment authentication, such as drive-through, etc. during the vehicle operation.

In addition, still another object of the present disclosure is to provide an in-vehicle biometric authentication system and an operation method that can provide a theft prevention effect in exceptional circumstances in which other person needs to drive temporarily, such as valet parking.

Technical Solution

To achieve these and other advantages and in accordance with the purpose of the present disclosure, as embodied and broadly described herein, there is provided an in-vehicle complex biometric authentication system which may include a controller configured to perform a driver authentication through a complex biometric sensor, to collect the driver's identification information and driving habit information, and to store the collected information as implicit authentication information. In this instance, the controller may determine whether to perform additional authentications or to maintain driver authentication by matching the detected situation information with the stored implicit authentication information, when any situation information related to the stored implicit authentication information is detected after success of driver authentication.

Here, the situation information related to the implicit authentication information may be detected by analyzing the driver identification-related data and driving habit-related data acquired using at least one sensor equipped within the vehicle, during the operation of vehicle after success of driver authentication.

In addition, the controller may output signals related to the initiation of a vehicle operation in the event of success of driver authentication. The controller may output a first notification to indicate the failure of the driver authentication and a second notification to indicate the failure of initiation of the vehicle operation in the event of failure of driver authentication.

In addition, when an opening and/or closing of vehicle door is detected, the controller may consider that a suspected theft of the vehicle has occurred and perform matching between the detected situation recognition information and the pre-stored implicit authentication information using at least one sensor in the vehicle. And, based on the matching results, the controller may determine whether to maintain the authentication status and whether to perform additional authentications.

In addition, the controller may maintain the authentication status when the level of matching the identification information and driving habit information corresponding to the detected situation recognition information with the stored implicit authentication information is higher than a first reference range. In addition, when the inconsistency degree of matching the identification information and driving habit information corresponding to the detected situation recognition information with the stored implicit authentication information is below a second reference range, the controller may release the authentication status and output a request for additional authentications based on biometric information.

In addition, the controller may output a signal that, after the release of the driver authentication status, ceases to start the vehicle until additional authentication succeeds upon request to perform additional authentications.

In addition, the controller may update the implicit authentication information by collecting the driver's identification information and driving habit information recorded after the success of driver authentication under additional authentications. Accordingly, the controller may determine whether additional authentications are required by matching with the implicit authentication information at every driver authentication.

In addition, the in-vehicle biometric authentication system in accordance with the present disclosure may further include a position calculation unit configured to calculate the position of the vehicle, for instance, GPS. In this instance, the controller may determine whether to perform additional authentications based on the matching results of the stored implicit authentication information with the situation recognition information detected before and after recognition, when the position of the vehicle is perceived to be located in a designated location.

The situation recognition information related to the implicit authentication information may include identification information and driving habit information newly collected after driver authentication. In addition, the controller may periodically match the newly collected identification information and driving habit information with the implicit authentication information.

The situation information related to the implicit authentication information may be detected by analyzing driver identification data and driving habit data acquired using at least one sensor equipped in the vehicle during the operation of the vehicle after success of driver authentication.

Here, the identification information may mean at least part of a plurality of biometric information or other biometric information than the plurality of biometric information. In addition, here, the driving habit information may include multiple operation-related behavioral items. Specifically, the multiple driving-related behavioral items may include at least part of the quantity of driver's utterance recorded during operation of a vehicle, an average driving speed, a grip position of a handle, a pressure level applied to a handle, a rotational speed of a handle, and a pressure level applied to an acceleration pedal.

In addition, the controller may calculate matching score by the biometric information corresponding to the identification information and multiple operation-related behavioral items with respect to the detected situation recognition information, and determine whether to maintain driver authentication by using the calculated matching score. For example, when the calculated matching score is above a first reference range, the driver authentication may be maintained without performing additional authentications, while when the calculated matching score is below a second reference range, which is lower than the first reference range, driver authentication is released and additional authentications may be performed.

In addition, the in-vehicle biometric authentication system in accordance with the present disclosure may perform other person driving mode according to the preset inputs after success of the driver authentication, to provide a theft prevention effect even in exceptional circumstances in which other person needs to drive temporarily, such as valet parking.

Depending on the performance of other person driving mode, the controller may perform registration of a new driver based on biometric information acquired using at least part of the multiple biometric sensors. In addition, in the other person driving mode, the detection of situation recognition information related to implicit authentication information may be limited without collecting identification information and driving habit information to generate implicit authentication.

When opening and closing of the vehicle door is detected, registration of a new driver may be released that is performed in the other person driving mode. The controller may then detect situation recognition information related to implicit authentication and determine whether to maintain the authentication status of the driver authentication based on detected situation recognition information.

In addition, in accordance with another embodiment of the present disclosure, there is provided a vehicle terminal which may include a communication unit configured to receive biometric information from multiple biometric sensors equipped within the vehicle when a driver's boarding in a vehicle is detected, a controller configured to perform driver authentication based on received biometric information, and collect driver identification information and driving habit information when the driver authentication is succeeded, and a memory configured to store the collected identification information and driving habit information as implicit authentication information. The controller of the vehicle terminal may, after success of the driver authentication, detect situation recognition information related to the implicit authentication information and determine whether to perform additional authentications based on the matching results of the detected situation recognition information with the implicit authentication information.

Advantageous Effect

According to the embodiments of the present disclosure, authentication is naturally carried out in the course of preparing the operation with the vehicle on board, thereby reducing the additional time for driver authentication and increasing security by combining implicit authentication during the vehicle operation. As a result, it is possible to satisfy both the conflicting needs of driver's convenience and prevention of vehicle theft.

In addition, the payment may be made without additional authentication through implicit authentication in situations requiring payment authentication, such as drive-through, during vehicle operation, and thus contribute to user convenience.

Furthermore, in exceptional circumstances in which other person is required to drive temporarily, such as valet parking, other driver is allowed to be registered to the extent permitted by the driver, and by limiting the range of use of services by other registered driver, the use of services can be increased in exceptional circumstances and the effectiveness of theft prevention can be satisfied.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with another element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
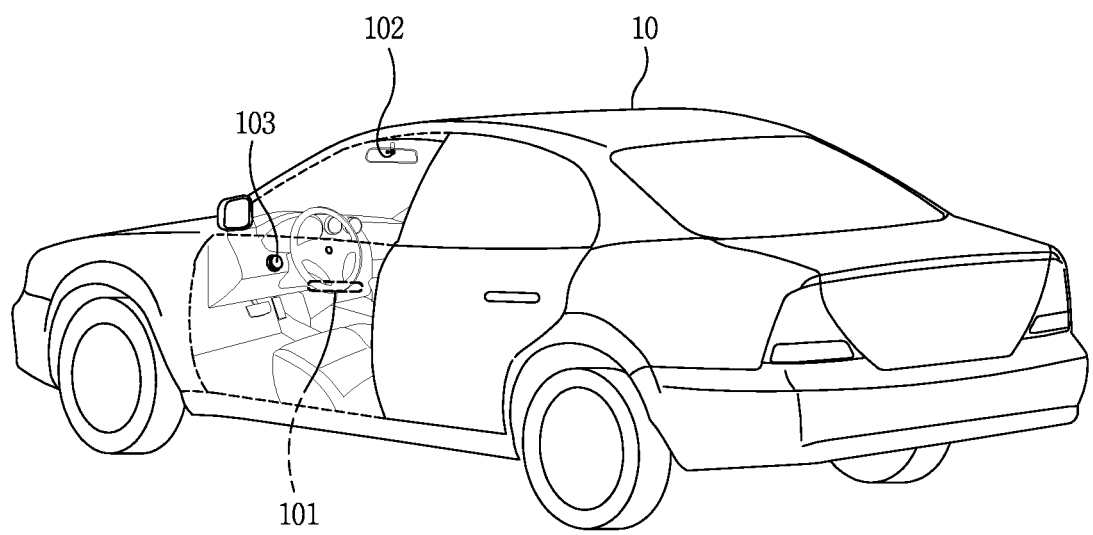
FIG. 1 is a diagram illustrating an example of a vehicle to which a complex biometric authentication system related to the present disclosure is applied.
Figure 2:
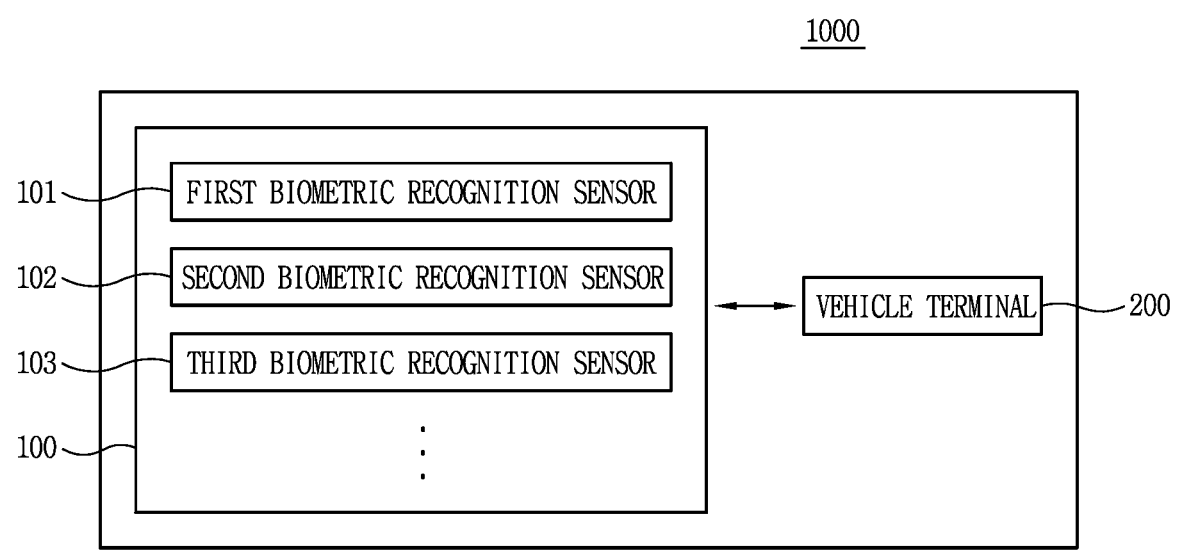
FIG. 2 is an exemplary block diagram illustrating a complex biometric authentication system related to the present disclosure.

Accompanying FIG. 1 is a diagram illustrating an example of a vehicle to which a complex biometric authentication system related to the present disclosure is applied, and FIG. 2 is an exemplary block diagram illustrating a complex biometric authentication system related to the present disclosure.

The complex biometric authentication system in accordance with the present disclosure may mean a vehicle control system for driver authentication. Further, the in-vehicle complex biometric authentication system in accordance with the present disclosure may include various biometric sensors equipped in the vehicle, at least one external server, an external terminal, or a vehicle terminal capable of communicating with another vehicle.

Reference is first made to FIG. 1, one or more biometric sensors 101, 102 and 103 may be provided within the vehicle 10 to which the complex biometric authentication system in accordance with the present disclosure is applied.

For example, a first biometric recognition sensor 101 equipped in a vehicle door may be a fingerprint recognition sensor, and a second biometric recognition sensor 102 equipped in a mirror of the vehicle may be a face recognition sensor. In addition, a third biometric recognition sensor 103 may be a voice recognition sensor for driver's voice authentication.

As such, biometric information acquired from the multiple biometric sensors 101, 102 and 103 is inputted to the vehicle terminal and the controller of the vehicle terminal performs authentication procedure by matching the acquired biometric information with the preset biometric information of the driver.

Specifically, referring to FIG. 2, the in-vehicle biometric authentication system 1000 is configured such that the multiple biometric sensors 101, 102 and 103 communicate with the vehicle terminal 200, and biometric information acquired by the multiple biometric sensors 101, 102 and 103 is transmitted to the vehicle terminal 200.

The vehicle terminal 200 performs authentication procedures by matching biometric information acquired from at least part of the multiple biometric sensors 101, 102 and 103 with the registered driver's biometric information.

To this end, the vehicle terminal 200 may include a communication unit (not shown) that communicates over the network with the in-vehicle biometric sensors 100 and the external server.

In addition, the vehicle terminal 200 may include a memory containing the registered driver's identification information and biometric information. As for the biometric information stored in the memory, for example, drivers' face images, fingerprint information, iris images, voice files and heart rate information may be included.

The vehicle terminal 200 presented herein may be implemented using a variety of different types of terminals. Examples of such terminals may include mobile phones, smart phones, laptop computers, digital broadcast terminals, PDAs (personal digital assistances), PMPs (portable multimedia players), navigators, slate PCs, tablet PCs, ultra books, wearable devices (for instance, smart watch, smart glass, HMDs (head mounted displays)), and the like.

On the other hand, the driver's behavioral patterns, particularly implicit authentication based on driving patterns are combined additionally to the explicit authentication in the present disclosure. The implicit authentication method uses the results obtained by analyzing the patterns of the driver's behavior to perform the authentication. When only the implicit authentication is used, the authentication is less accurate and registration time is longer. In addition, when only the explicit authentication is used, there are problems in that the security is high, but personal information may be leaked and driver convenience may be reduced.

Thus, in the present disclosure, explicit authentication and implicit authentication are used in combination, without using explicit or implicit authentication independently, the security of the continuation of authentication can be increased.

In addition, since it is possible to determine whether to further perform additional authentications by performing implicit authentication when a situation is detected in which a vehicle is suspected of being stolen, driver convenience with enhanced security can be provided and usability can be more enhanced.

In addition, implicit authentication based on detected situation recognition information after performing explicit certification is performed, thereby reducing the registration time of implicit authentication to prevent vehicle theft.

Hereinafter, referring to FIG. 3, description will be given in more detail of the method for performing driver authentication by combining explicit authentication and implicit authentication based on situation information using complex biometric sensors in accordance with one embodiment of the present disclosure.

Figure 3:
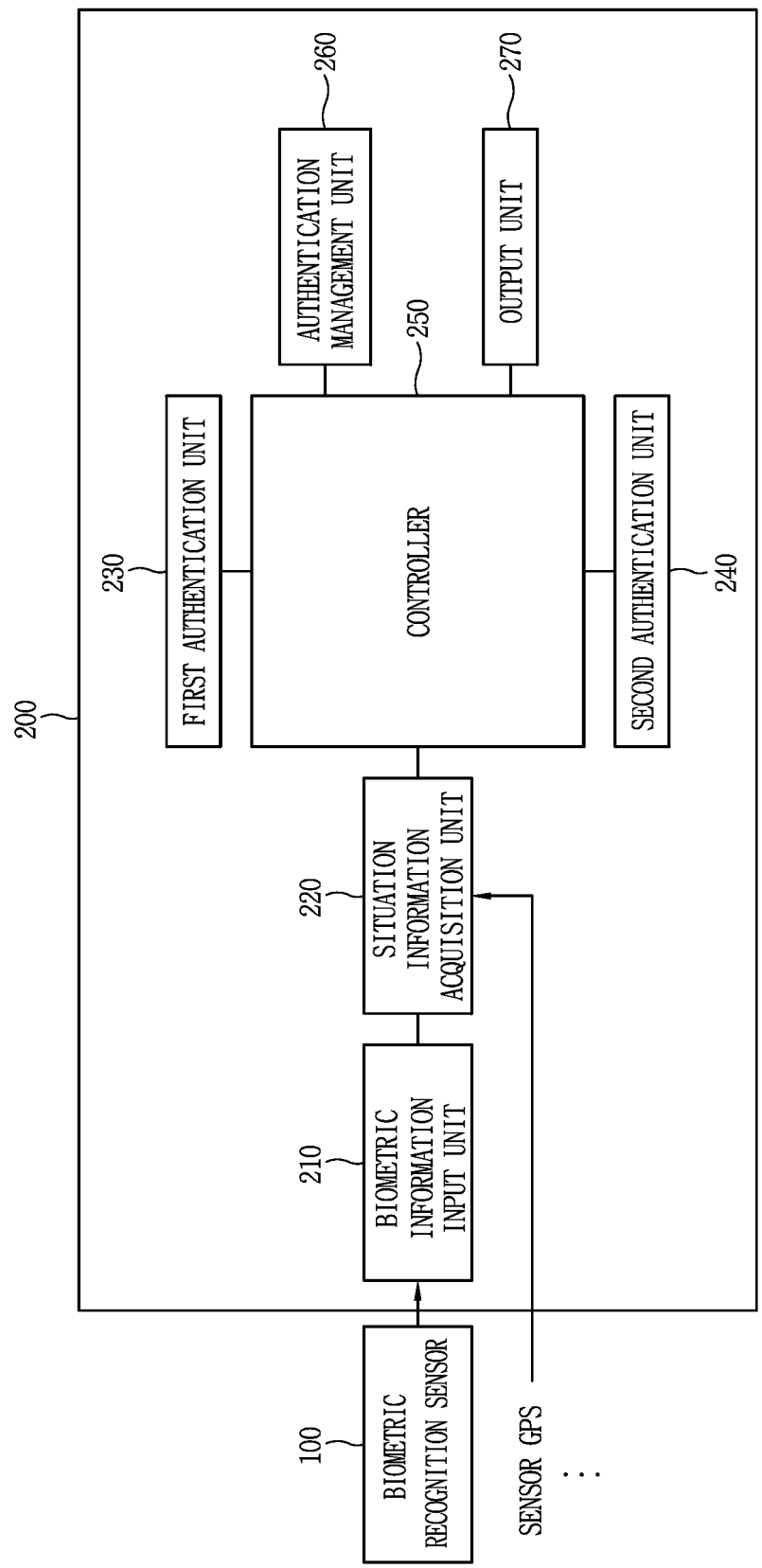
FIG. 3 is a conceptual view illustrating a procedure to perform driver authentication by combining explicit authentication and implicit authentication based on situation information using a complex biometric authentication system in accordance with an embodiment of the present disclosure.

Referring to FIG. 3, biometric information acquired through the biometric sensor 100 is provided to the biometric information input unit 210 of the vehicle terminal 200.

The vehicle's biometric sensor 100 may be activated at the time of detection of a driver's boarding in the vehicle.

Driver's boarding in the vehicle may be detected by sensors equipped in the vehicle. For example, vehicle boarding may be detected through signals received from the vehicle's door opening and closing sensors, and changes in pressure received by the driver's seat pressure sensors, etc. In addition, driver's boarding may be detected on the basis of signals received from outside the vehicle. For example, when a vehicle start signal is received from the smart key, it can be apprehended that vehicle boarding is performed from the time the signal is received.

The vehicle's biometric sensor 100 may be automatically converted to an inactive state after a certain period of time has elapsed since the driver's vehicle exit was detected.

The biometric information input unit 210 may receive an input of or receive biometric information inputted from biometric sensors equipped within the vehicle, for instance, fingerprint recognition sensors, iris recognition sensors, face recognition sensors, voice recognition sensors, and vessel recognition sensors.

In the latter case, the biometric input unit 210 may mean a communication module capable of receiving biometric information acquired from the sensor.

Biometric information provided to the biometric information input 210 and signals detected through other sensors in the vehicle, for instance, GPS sensors and door opening and closing sensors, may be transmitted to the situation information acquisition unit 220.

When the driver's vehicle boarding is detected, the situation information acquisition unit 220 collects biometric information detected using multiple biometric sensors and the sensing information obtained through other sensors in the vehicle and transmits it to the controller 250.

The situation information acquisition unit 220 communicates with the controller 250, when it is determined that the vehicle has been stolen, that the driver is indeed suspected, or that a payment authentication has been requested, to transmit a signal corresponding to this situation recognition information to the controller 250.

The signal corresponding to the situation recognition information may occur when a change beyond the reference range is detected in the identification information and driving habit information corresponding to the pre-stored implicit authentication after success of the driver's authentication.

To this end, the controller 250 may control the situation information acquisition unit 220 to collect driver identification information and driving habit information during vehicle operation after completion of explicit authentication.

Here, the driver identification may include at least part of the plurality of biometric information, or may include biometric information other than the plurality of biometric information. Other biometric information may include, for example, driver's weight information which is estimated through the driver's seat pressure sensor, driver's voice information, and the like. Although such biometric information is not highly accurate, it may be an element of situation recognition that is suspected to be a true driver.

When the number of such situation recognition elements is high or the variation is over a certain range, a signal corresponding to the situation recognition information may be output.

The driver's driving habit information includes multiple driving-related behavioral items. Here, the multiple driving-related behavioral items may include at least part of the quantity of the driver's utterance, average driving speed, grip position of a handle, pressure level applied to a handle, rotational speed of a handle, and pressure level applied to an acceleration pedal, recorded during operation of a vehicle.

To collect such driving-related behavioral items, the vehicle terminal 200 may operate in conjunction with the Advanced Driver Assistance System (ADAS). In addition, the vehicle terminal 200 may receive sensed information from cameras, microphones, speed meters, touch sensors in the handle, and pressure sensors equipped in the vehicle.

Signals that correspond to situation recognition information may occur when the specified conditions are met. For example, when a door opening or closing is detected, or when the vehicle enters a particular place or position, a signal that corresponds to the situation recognition information may be output to perform an implicit authentication upon reaching the preset time period.

The controller 250 performs explicit authentication to the driver based on the biometric information received in the biometric input unit 100. In addition, the controller 250 performs implicit authentication to the driver in the authentication state, based on the signal corresponding to the information acquired by the situation information acquisition unit 220 and the situation information.

Though not shown, the vehicle terminal 200 may include an additional memory for storing the registered driver's identification information and driving habit information as implicit authentication information.

The controller 250 matches the identification information and driving habit information corresponding to the detected situation recognition information with the stored implicit authentication information, when situation recognition information related to implicit authentication information is detected, after success of the driver authentication. In other words, implicit authentication is performed depending on the detection of situation recognition information.

The controller 250 determines whether to perform additional authentications based on the results of the performance of the implicit authentication. Specifically, in the event of a failure of implicit authentication, additional driver authentications may be requested. In case of success of implicit authentication, the operation may be maintained without outputting the alarm to minimize obstruction of driving.

The first authentication unit 230 determines success of the explicit authentication using the biometric information contained in the authentication performance command of the controller 250. And the first authentication unit 230 transmits signals corresponding to the success of the explicit authentication to the controller 250.

The initiation of explicit authentication by the first authentication unit 230 in the present disclosure may be carried out at the time the driver's boarding in a vehicle is detected. Alternatively, explicit authentication by the first authentication unit 230 may be carried out naturally while the driver is boarded in the vehicle.

For example, when a driver opens or closes a vehicle door to enter a vehicle, a fingerprint recognition sensor placed on the door, a pressure sensor for the driver's seat when the driver sits on the driver's seat, a face recognition sensor through a camera, an iris recognition sensor, and fingerprint information detected while applying a push input to the start button for the vehicle are naturally transmitted to the first authentication unit 230 through the controller 250. Therefore, the time required for the driver's explicit authentication is removed or minimized.

The second authentication unit 240 determines success of the implicit authentication using situation recognition information related to the implicit authentication information contained in the authentication execution command of the controller 250. And the second authentication unit 240 transmits signals corresponding to the success of the implicit authentication to the controller 250.

When signals corresponding to the success of the implicit authentication are received from the first authentication unit 230, the controller 250 transmits an authentication execution command to the second authentication unit 240. Accordingly, the authentication unit 240 performs registration for implicit authentication using the driver's identification information and driving habit information collected under the authentication status.

Even after registration for implicit authentication is performed in the second authentication unit 240, identification information and driving habit information corresponding to the implicit authentication are updated whenever explicit authentication is succeeded by the first authentication unit 230.

In this instance, update of the identification information and driving habit information by the second authentication unit 240 may be carried out through the collection, learning and processing of vast data by the artificial intelligence unit of the controller 250.

An authentication management unit 260 transmits a request for authentication execution to the controller 250 depending on a user's request, detection of driver's boarding in a vehicle, or detection of situation recognition information. In addition, the authentication management unit 260 may transmit notifications to the controller 250 on the success of authentication of the first authentication unit 230 and/or the second authentication unit 240.

An output unit 270 may output different signals corresponding to the success or failure of authentication of the first authentication unit 230 and/or the second authentication unit 240. In addition, the output unit 270 may output the theft report notification when implicit authentication by the second authentication unit 240 fails and additional authentications fail in the event of a suspected theft.

On the other hand, the in-vehicle complex biometric authentication system in accordance with the present invention may output signals related to the initiation of a vehicle operation upon successful explicit authentication after the driver's boarding in a vehicle. These signals may be the start of autonomous driving using ADAS functions. Accordingly, actions such as excel unlocking may be performed.

Figure 4:
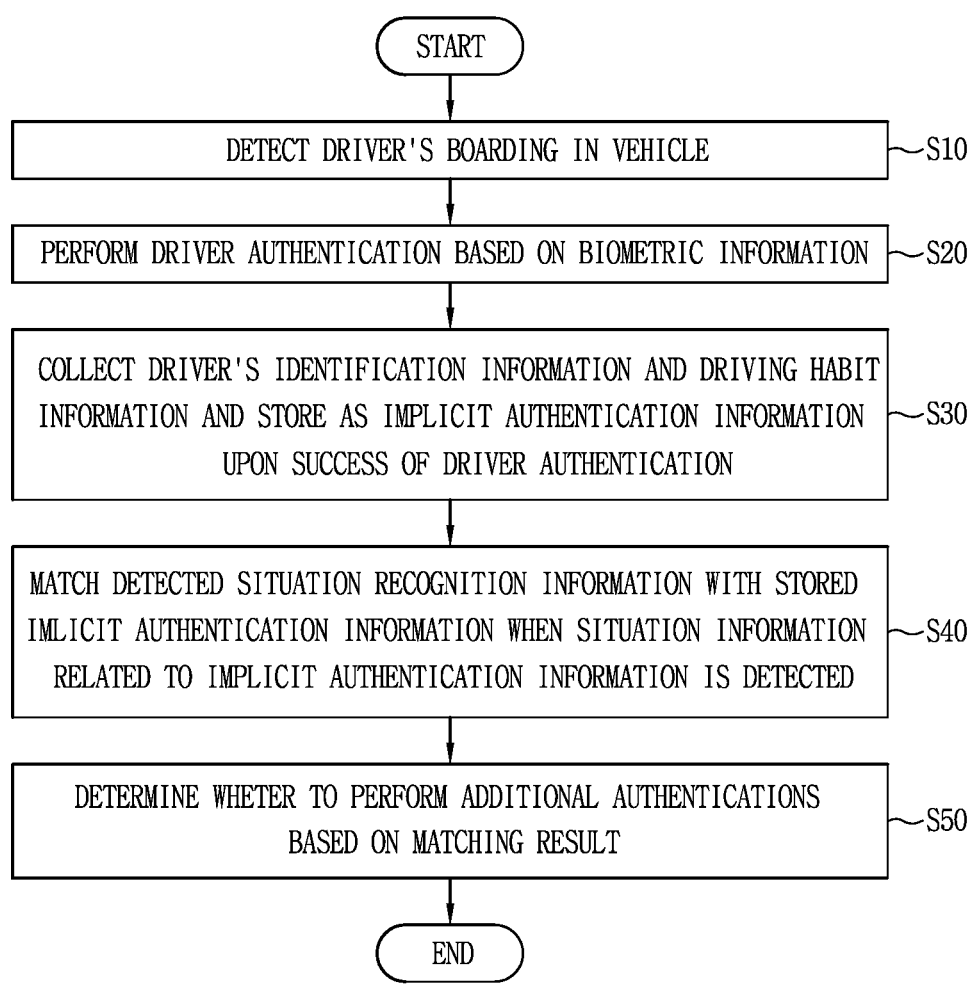
FIG. 4 is a representative flowchart illustrating a method for determining whether to perform additional authentications for preventing vehicle theft by combining explicit authentication and implicit authentication with respect to a driver in accordance with an embodiment of the present disclosure.

Meanwhile, the in-vehicle complex biometric authentication system in accordance with the present disclosure may output a second notification to notify the failure of initiation of the vehicle operation together with the first notification to notify the failure of authentication in the event of an explicit authentication failure after the driver's boarding. Depending on the output of the second notification, the initiation of the vehicle operation is restricted. Accordingly, for example, actions such as maintaining the accelerator lock may be performed. FIG. 4 is a representative flowchart illustrating a method for determining whether to perform additional authentication for preventing vehicle theft by combining explicit authentication and implicit authentication with respect to a driver in accordance with an embodiment of the present disclosure.

Referring to FIG. 4, the in-vehicle complex biometric authentication system in accordance with the present disclosure may detect the driver's boarding in the vehicle through various sensors equipped in the vehicle (S10).

While driver's boarding in a vehicle is detected, the system or the vehicle terminal in accordance with the present disclosure performs driver authentication based on biometric information acquired through a complex biometric sensor equipped in the vehicle (S20), i.e. explicit authentication is performed.

When driver authentication is successful, driver's identification information and driving habit information are collected and stored as implicit authentication information (S30). As such, since implicit authentication information is collected after the success of explicit authentication in the present disclosure, the timing of the collection of implicit authentication becomes clear and registration time is also reduced.

The driver identification information may include at least part of the plurality of biometric information or biometric information other than the plurality of biometric information. Here, the conditions of the other biometric information may be met if it is an element of circumstances, which can be assumed to be the same person as the driver, or if it is an element of circumstances, which can be suspected to the different person from the driver.

Therefore, the driver's face silhouette, and the weight information estimated through the driver's seat pressure sensor, may also be used as other biometric information.

The driver's driving habit information includes multiple driving-related behavioral items. Multiple driving-related behavioral items may include at least part of quantity of driver's utterance, average driving speed, grip position of a handle, pressure level applied to a handle, rotational speed of a handle, and pressure level applied to an acceleration pedal, recorded during operation of a vehicle.

The in-vehicle complex biometric authentication system may detect situation recognition information related to implicit authentication, during the operation of the vehicle.

The situation recognition information related to implicit authentication information is detected by analyzing acquired driver's identification-related data and driving habit-related data using at least one sensor equipped in the vehicle during vehicle operation after the success of driver authentication.

Specifically, when the analysis of the driver's identification-related data and driving habit-related data indicates that the matching level is below the reference range, it is considered that suspected theft or suspected true driver situation has occurred. Accordingly, the implicit authentication is performed by matching the identification information and driving habit information collected at the time before and after such situation recognition information is detected with the stored implicit authentication information.

Next, matching the detected situation recognition information with the stored implicit authentication information is performed (S40).

Specifically, for this purpose, the controller of the vehicle's complex biometric authentication system may calculate matching scores for the biometric information corresponding to the identification information and the multiple operation-related items with respect to the detected situation recognition information. In addition, the calculated matching score may be used to determine whether to maintain the driver's authentication.

In addition, based on these matching results, determination as to whether to perform additional authentications is made (S50).

Specifically, the controller controls to maintain authentication status when the level of matching the identification information and driving habit information corresponding to the detected situation recognition information with the stored implicit authentication information is above the first reference range. Here, the first reference range may mean the range of matching scores in which identification information and driving habit information corresponding to the detected situation recognition information is determined to be a true driver.

In addition, the controller controls to release authentication status when the level of matching discrepancy of the identification information and driving habit information corresponding to the detected situation recognition information with the stored implicit authentication information is below the second reference range. Here, the second reference range may mean the range of matching scores in which identification information and driving habit information corresponding to the detected situation recognition information is determined to be a false driver.

Upon release of the authentication status, requests are outputted for performing additional authentications based on biometric information.

In addition, the controller may output a signal that stops initiation of operation of the vehicle until additional authentication under the request is successful after the release of the authentication status. In this instance, a theft report notification may be transmitted to the designated server and agency.

Here, the additional authentications may be performed using the complex biometric authentication method, as in the initial explicit authentication. One such method of biometric authentication may be used in the score fusion method.

In the score fusion method, various artificial intelligence algorithms that combine matching scores may be used. Algorithms that may be used in the score fusion method may include combination-based core fusion algorithm, classifier-based core fusion algorithm, density-based core fusion algorithm, and so on. In addition, the Combination-based core fusion algorithm may include static rule, dynamic lighting, triangular norms, and so on. Classifier-based core fusion algorithms may include support vector machine (SVM), AdaBoost (RS-ADA), and Dampster-Shafer (DS), and the like. The density-based score fusion algorithm may include the Liklihood feature (LF), and the like.

In addition, various known algorithms in the score fusion method may be used in the present disclosure, and in order not to deviate from the purpose of this disclosure, the specific description is omitted.

Combined biometric authentication for additional authentications performed in case of failure of implicit authentication and complex biometric authentication for initial explicit authentication may differ in their matching methods. For example, for the additional authentications, more enhanced complex biomechanical information and matching methods may be applied to prevent vehicle theft.

Further, after the success of the driver authentication depending on the additional authentications, the driver's identification information and driving habit information may be collected to update the implicit authentication information.

On the other hand, in the present disclosure, the aforementioned implicit authentication and additional authentications will have to be carried out when the vehicle is suspected to be stolen or is suspected to be a genuine driver.

In one example, when opening or closing of a vehicle door is detected in the driver's authentication state, an implicit authentication procedure may be performed by matching the detected situation recognition information detected before or after detection of the opening or closing of the door and the pre-stored implicit authentication information. And, based on the results of the execution of the implicit authentication procedure, it is possible to determine whether the authentication status is maintained and whether additional authentications are performed.

In another embodiment, when the position of the vehicle calculated by a calculation unit such as GPS is recognized to correspond to a specified location, an implicit authentication procedure may be performed by matching the situation recognition information detected before or after the vehicle enters into the specified location with the pre-stored implicit authentication information.

In still another embodiment, matching of newly collected identification information and driving habit information with implicit authentication may be performed periodically. In this instance, the output of alarms corresponding to the executions and execution results of implicit authentication may be limited so as not to cause inconvenience to the driver due to repeated authentication.

Figure 5:
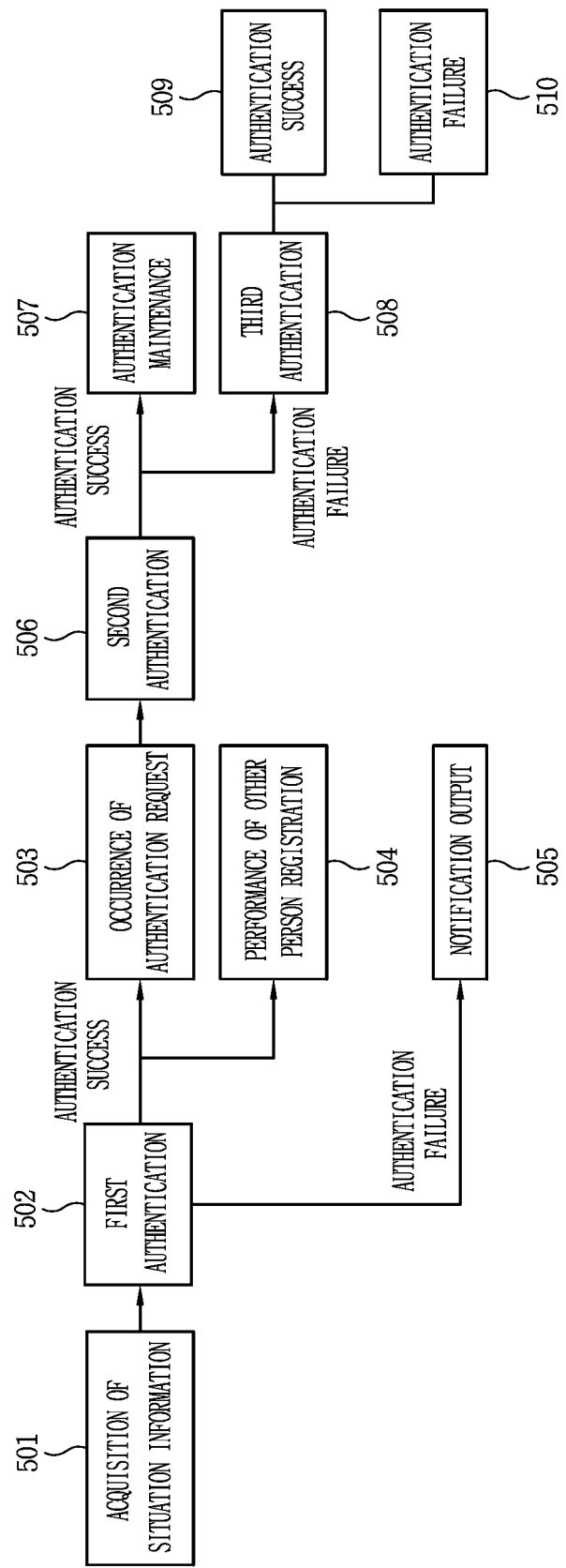
FIG. 5 is a conceptual view for specifically explaining performance of explicit authentication, implicit authentication and additional authentications according to detection of a variety of situation recognition information in accordance with an embodiment of the present disclosure.

FIG. 5 is a conceptual view for specifically explaining performance of explicit authentication, implicit authentication and additional authentications according to detection of a variety of situation recognition information in accordance with an embodiment of the present disclosure.

First, the in-vehicle biometric authentication system acquires a variety of situation information while operations for the driver's boarding in a vehicle and initiation of operation of a vehicle are performed (501).

Here, the situation information may include both identification information and driving habit information related to implicit authentication in addition to the complex biometric information acquired while the driver is boarded in the vehicle.

Next, the first authentication is performed based on the acquired situation information (502).

Here, the first authentication may mean an explicit authentication or a combination of explicit and implicit authentication.

For example, before information for implicit authentication is registered, the first authentication is performed only by the complex biometric information. In this instance, the first authentication may be performed only with the biometric information acquired through the complex biometric sensors such as fingerprint recognition sensors, face recognition sensors, iris recognition sensors and voice recognition sensors equipped in the vehicle.

In addition, once information for implicit authentication is registered, for example, the first authentication is performed by combining the composite biometric information with the identification information and driving habit information associated with the implicit authentication. In this instance, the first authentication may be performed by combining other identification information and driving habit information acquired during the driver's boarding in a vehicle and operation for initiation of driving are executed, in addition to the biometric information acquired through the aforementioned complex biometric sensors.

Upon successful completion of the first authentication, the vehicle operation may be initiated and a request to start registration for implicit authentication may be made. Upon request to start registration for implicit authentication, driver's identification information and driving habit information are collected during vehicle operation. Such information collected is registered as implicit authentication information.

As such, during the operation of the vehicle after success of the first authentication, the complex biometric authentication system in accordance with the present disclosure may detect occurrence of the authentication request (503). The occurrence of authentication request may include a suspected theft of the vehicle, a possible theft of the vehicle, and a situation requiring payment authentication.

Here, the occurrence of the authentication request may be detected by various sensors equipped in the vehicle. For example, when a door opening and closing of a vehicle is detected through a door opening and closing detection sensor, or when the vehicle is detected in a specific location via GPS, an authentication request may be identified as having occurred.

When such a request for authentication is detected, the system performs a second authentication (506). In this instance, the second authentication means implicit authentication. Therefore, the second authentication is performed at least after implicit authentication information is registered.

In one embodiment, the second authentication may be implicit authentication or biometric authentication performed using fewer biometric sensors than the first authentication.

In other words, the authentication success is determined by calculating the matching score between the identification information and driving habit information detected through the sensors in the vehicle with the pre-stored implicit authentication information, without explicit user action as in the first authentication.

On the other hand, when a preset input signal is received after the success of the first authentication, the biometric authentication system in the vehicle may perform other person registration to enter the other person driving mode (504). Entering the other person driving mode, collection of situation information related to implicit authentication is limited.

In the other person driving mode, a third party may be registered as a driver. However, the range of services provided to registered third parties may differ from the range of services provided to the true driver. In addition, in one example, a true driver may set the range of services or restricted services available for third-party driver registration.

When a second authentication performed following the occurrence of the authentication request is successful, the explicit authentication may be maintained (507). In other words, the system treats the first authentication as valid. In this instance, it is not necessary to output an alarm to indicate that the second authentication has been successful or to maintain the first authentication.

In the event that a second authentication performed following the occurrence of the authentication request fails, the explicit authentication is released and the third authentication is performed (508). At this time, information may be outputted to indicate that the first authentication, the explicit authentication, has been released.

On the other hand, the third authentication means additional biometric authentication carried out in situations where the vehicle is suspected of theft or the driver is not a true driver. Therefore, it means explicit authentication.

At least part of the biometric information used for the third authentication may differ from the biometric information used for the first authentication. Specifically, a more enhanced biometric authentication or a different combination of biometric authentication may be applied, considering the suspected theft of the vehicle. For example, when fingerprint authentication information and face authentication information are used in the first authentication, voice authentication information and iris authentication information may be used in the third authentication.

On the other hand, third authentication may be carried out without an explicit request. For example, additional third authentication may be performed naturally through facial recognition sensors, such as cameras, mounted on the side of the vehicle handle. In this instance, the output of the notification may be limited, prior to the execution of the third authentication, to indicate that the second authentication has failed or that the first authentication has been released.

In such cases, the performance of the second and third authentications cannot be recognized externally, so the actual theft situation may be identified without interference from third parties.

Described in the foregoing is the performance of explicit, implicit and additional authentications satisfying the conflicting needs of driver convenience and vehicle theft prevention. On the other hand, if necessary, a third party may temporarily drive, such as valet parking. Even in this case, it is still necessary to prevent theft, which may occur in the unlikely event of a third party's operation.

Figure 6:
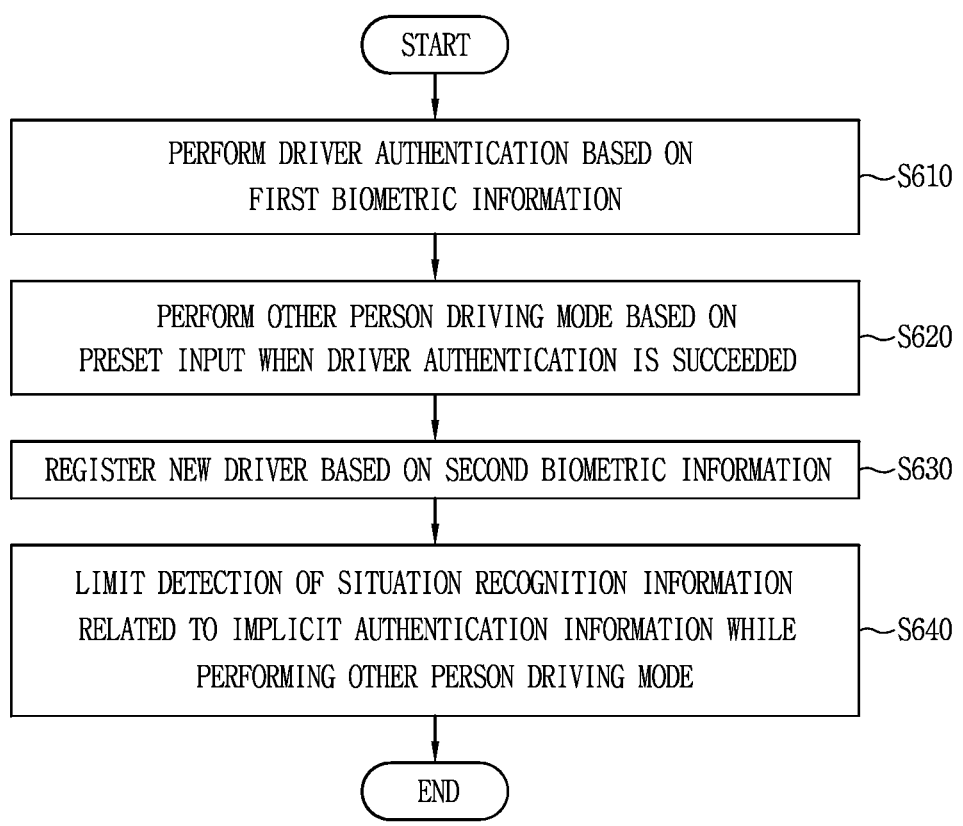
FIG. 6 is a flowchart illustrating a process to register and authenticate other drivers after explicit authentication of driver in accordance with another embodiment of the present disclosure.

FIG. 6 is a flowchart illustrating a process to register and authenticate other drivers after explicit authentication of driver in accordance with another embodiment of the present disclosure.

Referring to FIG. 6, the step to perform driver authentication based on first biometric information acquired using biometric sensors equipped in a vehicle (S610). Here, the first biometric information refers to biometric information to determine whether a driver is a registered true driver.

When driver authentication is successful, the other operation mode may be performed based on the preset input (S620).

Here, the preset input means the user's actions performed by the driver to perform a third party driver registration. For example, the preset input may include push inputs applied to a specific button equipped in the vehicle (e.g. unlock buttons), established user gestures, driver's voice commands, and input from a specific application on a vehicle terminal.

When a corresponding signal is generated according to these user actions, the signal is provided to the vehicle terminals linked to the in-vehicle biometric authentication system to initiate other person driving mode.

Next, for third-party driver registration, the process of acquiring second biometric information using in-vehicle biometric sensors is carried out (S630). At this time, acquired biometric information is used as information for new driver registration.

As such, during operation by a third party registered in the other person driving mode, the in-vehicle biometric authentication system restricts the detection of situation recognition information related to implicit authentication (S640).

Specifically, third party identification information and operation habit information may not be collected in the other person driving mode.

In addition, registration of a third party carried out in the other person driving mode may be released when the specified conditions are met. For example, a third party registration may be automatically unregistered when the opening and closing of a vehicle door is detected (e.g. in the case of valet parking) or when the vehicle arrives at a specified location (e.g. when the vehicle arrives home via a proxy drive).

When such third party registrations are released, situation recognition information related to implicit authentication is detected. In addition, based on the detected situation recognition information, determination as to whether the driver authentication is maintained is made.

When a third party registration is released, since the third party's identification information and driving habit information will not match the driver's stored identification information and driving habit information, the authentication status may be released. Subsequently, the situation is regarded as a suspected theft and a requested to carry out additional authentications is made.

When there is no response to an additional authentication request within the preset time, or when the additional authentication fails, an alarm may be output to indicate the failure of the authentication. In addition, theft notification signals may be transmitted to linked servers, agencies and others.

On the other hand, while the registration of a third party is maintained, the registered third party may be set up to use only part of the services that can be performed by the true driver. For example, services related to payment authentication may be set up to be restricted by registered third parties.

As described hereinbefore, in accordance with embodiments of the present disclosure, since authentication is naturally performed in the course of preparing the operation with the vehicle on board, thereby reducing the additional time for driver authentication and combining implicit authentication during vehicle operation, thereby increasing security. As a result, it can satisfy the conflicting needs of both driver convenience and prevention of vehicle theft. In addition, the payment will be made without additional authentication through implicit authentication in situations requiring payment authentication, such as drive-through, during vehicle operation, and thus contribute to user convenience. Furthermore, in exceptional circumstances that other persons are required to drive temporarily, such as valet parking, the other driver registration can be allowed to the extent permitted by the driver, and by limiting the range of use of services by other registered drivers, the use of services can be increased in exceptional circumstances and the effectiveness of theft prevention can be satisfied.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 250. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. An in-vehicle complex biometric authentication system, comprising:
   a sensor configured to sense vehicle boarding of a driver;
   a controller configured to perform driver authentication based on biometric information sensed by multiple biometric sensors when a driver's boarding in a vehicle is detected by the sensor, and to collect driver's identification information and drive habit information during operation of the vehicle when the driver authentication is successful; and
   a memory configured to store the identification information and driving habit information as implicit authentication information,
   wherein the controller is further configured to detect situation recognition information related to the implicit authentication information, after the driver authentication is successful, and to determine whether to perform additional authentications based on a matching result of the detected situation recognition information with the implicit authentication information.

2. The in-vehicle complex biometric authentication system of claim 1, wherein the controller is configured to output signals related to initiation of a vehicle operation when the driver authentication is successful.

3. The in-vehicle complex biometric authentication system of claim 1, wherein the controller is further configured to output a first notification to indicate failure of the driver authentication and a second notification to indicate failure of initiation of the vehicle's operation when the driver authentication is unsuccessful.

4. The in-vehicle complex biometric authentication system of claim 1, wherein the situation recognition information related to the implicit authentication information is detected by analyzing driver identification-related information and driving habit-related data acquired using at least one sensor equipped in the vehicle, during operation of the vehicle after success of driver authentication.

5. The in-vehicle complex biometric authentication system of claim 4, wherein the controller is configured to, when an opening or closing of a vehicle door is sensed, determine whether authentication status is maintained and whether additional authentications are performed, based on the matching results of the situation recognition information detected using the at least one sensor with the implicit authentication information.

6. The in-vehicle complex biometric authentication system of claim 5, wherein the controller is configured to maintain the authentication status when the level of matching the identification information and driving habit information corresponding to the detected situation recognition information with the stored implicit authentication information is higher than a first reference range, to release the authentication status and output a request for further authentication based on biometric information when the inconsistency degree of matching the identification information and driving habit information corresponding to the detected situation recognition information with the stored implicit authentication information is below a second reference range.

7. The in-vehicle complex biometric authentication system of claim 6, wherein the controller is configured to output a signal that, after the release of the authentication status, ceases to start the vehicle until further authentication succeeds upon request to perform further authentication.

8. The in-vehicle complex biometric authentication system of claim 6, wherein the controller is configured to update the implicit authentication information by collecting the driver identification information and driving habit information recorded after the success of driver authentication under additional authentication.

9. The in-vehicle complex biometric authentication system of claim 1, further comprising a global positioning system (GPS) device that calculates the position of the vehicle, and
wherein the controller is configured to determine whether to perform additional authentications based on the matching results of the situation recognition information detected before and after recognition with the stored implicit authentication information, when the position of the vehicle is perceived to be located in a designated location.

10. The in-vehicle complex biometric authentication system of claim 1, wherein the situation recognition information related to the implicit authentication information includes identification information and driving habit information newly collected after driver authentication, and
wherein the controller is configured to periodically perform matching the newly collected identification information and driving habit information with the implicit authentication information.

11. The in-vehicle complex biometric authentication system of claim 10, wherein the identification information includes at least part of a plurality of biometric information or other biometric information than the plurality of biometric information,
wherein the driving habit information includes multiple driving-related behavioral items, and
wherein the multiple driving-related behavioral items include at least part of the quantity of a driver's utterance recorded during the operation of the vehicle, an average driving speed of the vehicle, a grip position of a handle of the vehicle, a pressure level applied to a handle of the vehicle, a rotational speed of a handle of the vehicle, and a pressure level applied to an acceleration pedal of the vehicle.

12. The in-vehicle complex biometric authentication system of claim 10, wherein the controller is configured to calculate a matching score by the biometric information corresponding to the identification information and multiple driving-related behavioral items with respect to the detected situation recognition information, and determine whether to maintain driver authentication using the calculated matching score.

13. The in-vehicle complex biometric authentication system of claim 1, wherein the controller is configured to perform other person driving mode when a preset input is received after success of the driver authentication, and to perform registration of a new driver based on biometric information acquired through at least one of the multiple biometric sensors depending on the performance of the other person driving mode, and
wherein the detection of situation recognition information related to implicit authentication information is limited in the other person driving mode.

14. The in-vehicle complex biometric authentication system of claim 13, wherein the controller is configured to release registration of a new driver when opening and closing of a vehicle door is detected in the other person driving mode, to detect situation recognition information related to implicit authentication, and to determine whether to maintain authentication status of the driver authentication based on the detected situation recognition information.

15. An operation method of an in-vehicle complex biometric system, comprising:
detecting a driver's boarding in a vehicle using sensors equipped in the vehicle;
performing driver authentication based on biometric information detected using multiple biometric sensors when the driver's boarding in the vehicle is detected;
collecting driver's identification information and driving habit information during operation of the vehicle when the driver authentication is successful and storing the collected identification information and driving habit information as implicit authentication information; and
determining whether to perform additional authentications based on a matching result of detected situation recognition information with the stored implicit authentication information when situation recognition information related to the implicit authentication information is detected after success of the driver authentication.

16. A vehicle terminal, comprising:
a controller configured to:
receive biometric information from multiple biometric sensors equipped in a vehicle when a driver's boarding in the vehicle is detected,
perform driver authentication based on the received biometric information, and
collect driver's identification information and driving habit information when the driver authentication is successful; and
a memory configured to store the collected identification information and driving habit information as implicit authentication information,
wherein the controller is further configured to, after success of the driver authentication, detect situation recognition information related to the implicit authentication information and to determine whether to perform additional authentications based on matching results of the detected situation recognition information with the implicit authentication information.

* * * * *